United States Patent [19]

Mitchell et al.

[11] Patent Number: 4,689,824

[45] Date of Patent: Aug. 25, 1987

[54] IMAGE ROTATION METHOD

[75] Inventors: Joan L. V. Mitchell, Ossining; Karen L. Anderson, Peekskill; Frederick C. Mintzer, Shrub Oak, all of N.Y.

[73] Assignee: International Business Machines Corporation, Armonk, N.Y.

[21] Appl. No.: 567,293

[22] Filed: Dec. 30, 1983

[51] Int. Cl.$^4$ ............................................. G06K 9/32
[52] U.S. Cl. ..................................... 382/46; 340/727
[58] Field of Search ............... 382/46; 340/727, 724; 358/22, 260; 364/521, 518

[56] References Cited

U.S. PATENT DOCUMENTS

| | | | |
|---|---|---|---|
| 3,976,982 | 8/1976 | Eiselen | 382/46 |
| 4,168,488 | 9/1979 | Evans | 364/521 |
| 4,225,929 | 9/1980 | Ikeda | 340/727 |
| 4,366,505 | 12/1982 | Tsuda et al. | 358/260 |
| 4,412,294 | 10/1983 | Watts et al. | 364/521 |
| 4,493,108 | 1/1985 | Fryer et al. | 382/61 |
| 4,545,069 | 10/1985 | Kermisch | 382/46 |

FOREIGN PATENT DOCUMENTS 8302544  7/1983  Netherlands ......................... 340/724

OTHER PUBLICATIONS

"Parallel Linear Transformations on Two-Dimensional Binary Images", Casey et al., *IBM Tech. Disc. Bull.*, vol. 13, No. 11, Apr. 1971, pp. 3267-3268.

"Rotation of Images Using Contour Compressed Data", Morrin, T. H., *IBM Tech. Discl. Bull.*, vol. 18, No. 18, Jan. 1976, pp. 2640-2642.

"Shift Register System for Image Orientation", Gold et al., *IBM Tech. Disc. Bulletin*, vol. 18, No. 8, Jan. 1976, 382-46.

*Primary Examiner*—Leo H. Boudreau
*Assistant Examiner*—Jose L. Couso
*Attorney, Agent, or Firm*—George E. Clark; Terry J. Ilardi

[57] ABSTRACT

A method for rotation of a binary image by 180 degrees, includes the steps of: positioning first and second address pointers at the center of at the beginning and end respectively of an image to be rotated; indexing the first pointer in a first direction through said image; indexing the second pointer in a second direction through said image; exchanging, for each index step, a first image word at the first pointer with a second image word, at the second pointer if the first image word and the second image word have any two bits with different values; reversing all exchanged words; storing the reversed, exchanged words at said pointer locations; repeating the above steps until the first pointer and the second pointer have been indexed through all words in the image at which point the image has been rotated by 180 degrees.

20 Claims, 11 Drawing Figures

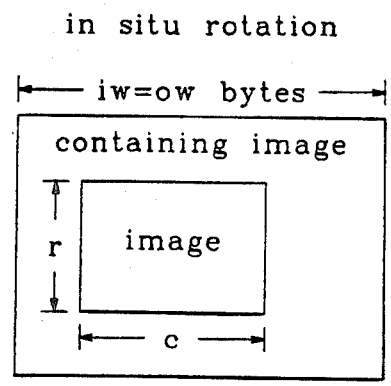
FIG. 1
FIG. 2
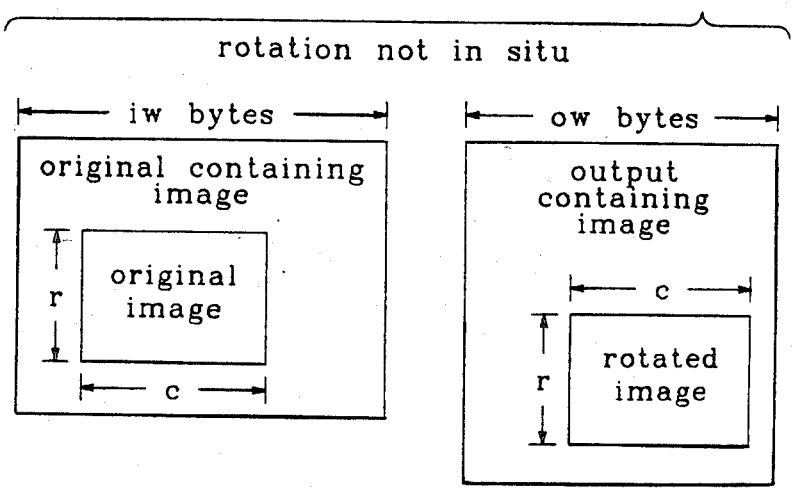
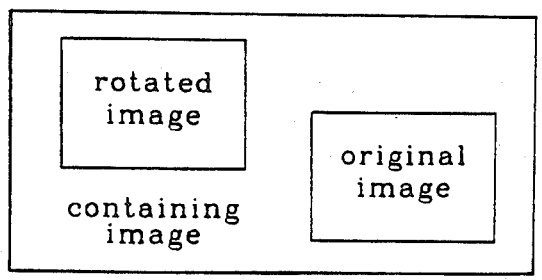
FIG. 3

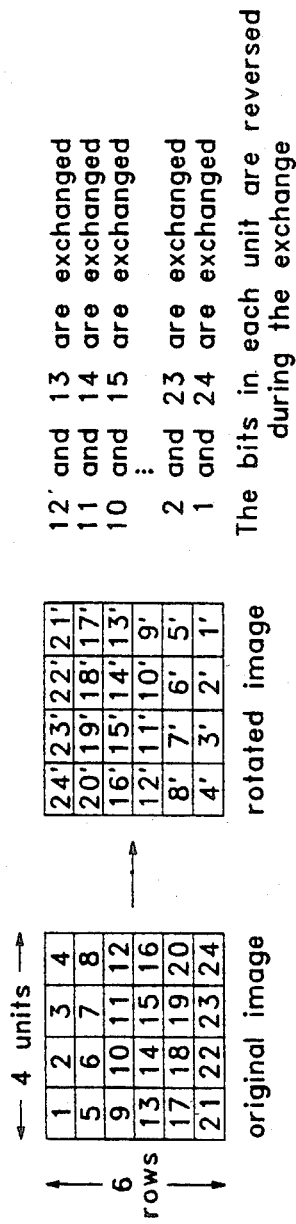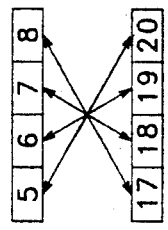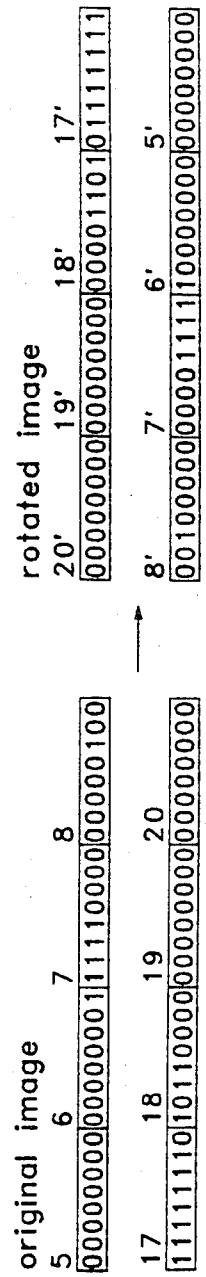
FIG. 4

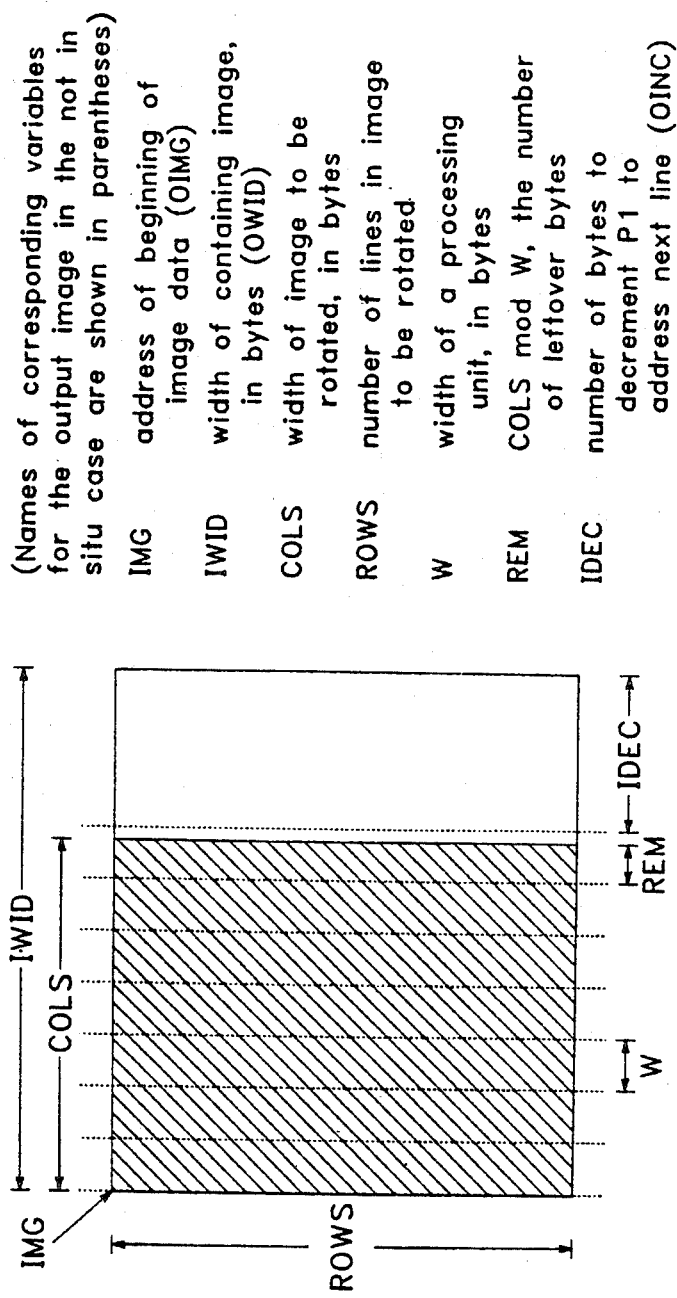

FIG. 6 Variables Used in Rotation Algorithms (Names of corresponding variables for the output image in the not in situ case are shown in parentheses)

IMG — address of beginning of image data (OIMG)
IWID — width of containing image, in bytes (OWID)
COLS — width of image to be rotated, in bytes
ROWS — number of lines in image to be rotated
W — width of a processing unit, in bytes
REM — COLS mod W, the number of leftover bytes
IDEC — number of bytes to decrement P1 to address next line (OINC)

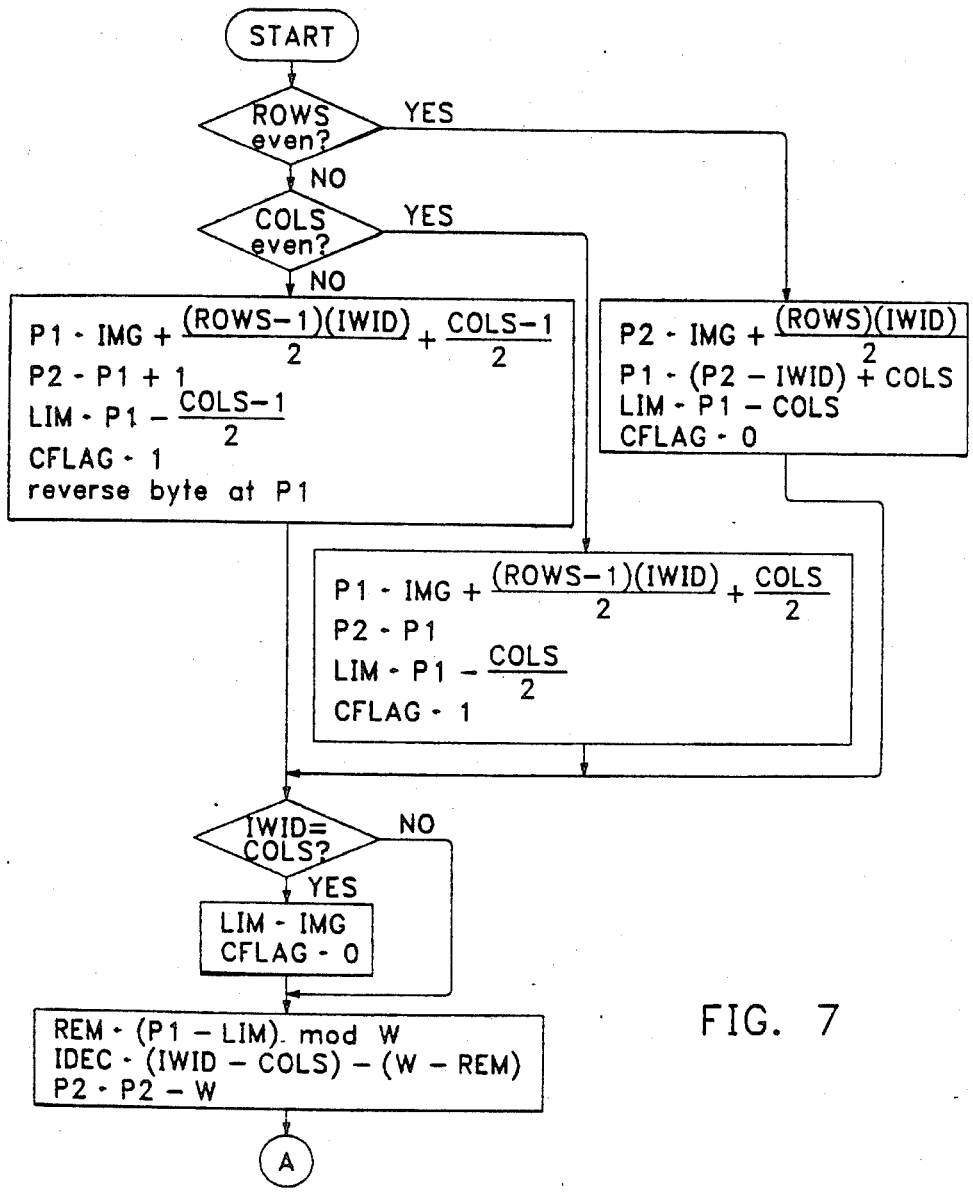

IMAGE ROTATION METHOD

BACKGROUND OF THE INVENTION

1. Field of the Invention

The present invention relates to digital image processing methods and more particularly to methods for image rotation.

2. Description of the Prior Art

The following are systems representative of the prior art.

U.S. Pat. No. 3,976,872 shows a method of rotation of an image by 90 degrees among other functions performed. However, the patent does not show a method for rotating an image by 180 degrees which includes testing groups of bits in the image to determine whether the group of bits is all the same value as does the present invention.

U.S. Pat. No. 3,968,475 shows a digital processor for extracting data from a binary image in which the image is divided into an array of sample areas each sample area containing an array of binary data spaces. Although the patent demonstrates image rotation by any one of a number of predetermined angles, the patent does not show a method for rotating an image by 180 degrees including testing the sample group to determine if all bits of the sample group are the same as does the method according to the present invention.

U.S. Pat. No. 4,052,699 relates to an image processing system wherein video data is stored in a matrix having n rows and n columns. The image is rotated 90 degrees in a piece-meal fashion by vertically accessing word by word video data previously stored as horizontal words. However, the method and apparatus of the patent do not test the group of words to be rotated to determine if all bits in the group are the same as does the method according to the present invention.

U.S. Pat. No. 4,168,488 shows hardware for image rotation of a word organized image buffer where the buffer is divided into a number of square sections each storing a portion of the full image. Although the patent shows apparatus for image rotation through an angle of 90 degrees, the patent does not show a method which includes testing a subimage to determine if all bits in the subimage are the same value as does the method according to the present invention.

U.S. Pat. No. 4,225,929 relates to a code converter including means for rotating an image about a center point. The patent does not include testing of bits in a subimage to determine if all bits are the same as does the method according to the present invention.

U.S. Pat. No. 4,271,476 relates to apparatus for rotating horizontal scan format images into vertical scan format images for printing or other processing. The patented apparatus divides the image into a number of sections and then rotates each section in sequence. The patent does not show a method including testing each section to determine if all bits are the same as does the method according to the present invention.

EPO published patent application No. 081,096 relates to an image rotation control circuit for controlling printing of an image on a printer. The published control circuit does not store the entire display but merely a single line at a time which is converted from a horizontal line to a vertical line or vice versa for printing. The publication does not show a method for rotating an image by 180 degrees including testing a portion of the image to determine if all bits representing picture elements are the same as does the method according to the present invention.

An article in the IBM Technical Disclosure Bulletin, Vol. 18, No. 8, January 1976, p. 2640 shows a method for rotation of images using contour compressed data. However, the article does not include testing portions of an image to determine if all bits are the same as does the method according to the present invention.

An article in the IBM Technical Disclosure Bulletin, Vol. 13, No. 11, April 1971, p. 3267 shows a method for performing a fast transformation of axes on two dimensional binary images. The article does not include testing portions of an image to determine if all bits are the same as does the method according to the present invention.

An article in the IBM Technical Disclosure Bulletin, Vol. 18, No. 8, January 1976 at page 2633 shows a shift register system for image orientation which among other functions rotates an image in $4 \times 4$ arrays of characters. The article does not include testing portions of an image to determine if all bits are the same as does the method according to the present invention.

The prior art discussed above does not teach nor suggest the present invention as disclosed and claimed herein.

SUMMARY OF THE INVENTION

Therefore, it is an object of the present invention to rotate a binary image by 180 degrees, by a method including the steps of: positioning first and second address pointers at the center or at the beginning and end respectively of an image to be rotated; indexing the first pointer in a first direction through said image; indexing the second pointer in a second direction through said image; exchanging, for each index step, a first image word at the first pointer with a second image word, at the second pointer if the first image word and the second image word have any two bits with different values; reversing all exchanged words; storing the reversed, exchanged words at said pointer locations; repeating the above steps until the first pointer and the second pointer have been indexed through all words in the image at which point the image has been rotated by 180 degrees.

Accordingly, the method of the present invention, for rotation of a stored image by 180 degrees, includes positioning first and second address pointers at the center or at the beginning and end respectively of an image to be rotated; indexing the first pointer in a first direction through said image; indexing the second pointer in a second direction through said image; exchanging, for each index step, a first image word at the first pointer with a second image word, at the second pointer if the first image word and the second image word have any two bits with different values; reversing all exchanged words; storing the reversed, exchanged words at said pointer locations; repeating the above steps until the first pointer and the second pointer have been indexed through all words in the image at which point the image has been rotated by 180 degrees.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 1 is a schematic diagram of in situ rotation according to the present invention.

FIG. 2 is a schematic diagram of not in situ rotation according to the present invention.

FIG. 3 is a schematic diagram of rotation of subimages according to the present invention.

FIG. 4 is a diagram showing an overview of the method according to the present invention.

FIG. 6 is a chart showing the nomenclature used with the present invention.

FIG. 7 is a flow chart of the initialization algorithm for in situ rotation according to the present invention.

In the drawing, like elements are designated with similar reference numbers, and identical elements in different specific embodiments are designated by identical reference numbers.

DESCRIPTION OF A PREFERRED EMBODIMENT OF THE INVENTION

Figure 5:
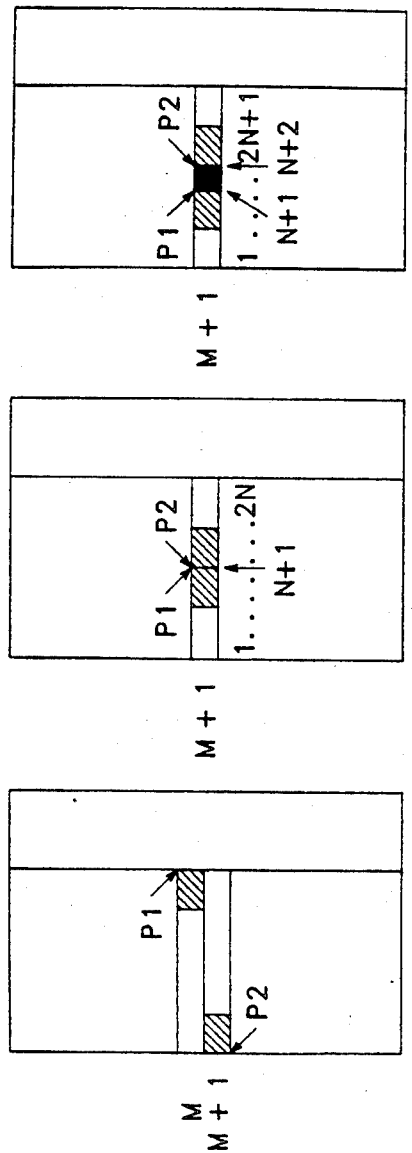
FIG. 5 is a diagram showing the operation of the pointers according to the present invention.

The method according to the present invention rotates an image by 180 degrees. Images are considered to exist in storage reading from left to right across the rows, from the top of the image to the bottom in columns. Rotation may be performed in situ, or the output image may occupy separate storage which does not overlap the storage occupied by the original image. It is possible to extract a rectangular portion of a larger image, rotate it, and store it as a portion of another larger image (or in the same place), if desired. The present method performs an in situ rotation if the calling routine supplies the same address for the original and output images. If the output image address is not equal to the original image address, then the rotation is not performed in situ, the input image is not altered by the rotation, and the original and output images are not permitted to overlap. The two basic types of rotation are illustrated in FIGS. 1 and 2. FIG. 1 shows in situ rotation in which the rotated image occupies the storage which contained the original image before rotation. The rotated image may not be wider than the containing image.

In FIG. 2, rotation of an image not in situ is shown. The original and rotated images occupy separate areas in storage. The original image is not altered by the rotation operation. The original and rotated images may not be wider than their respective containing images (although they may be the same width). If the area of storage between the first and last bytes (inclusive) of the original image overlaps the area of storage between the first and last bytes (inclusive) of the output image, the widths of the original and output containing images must be equal. Graphically, this situation is shown in FIG. 3. In this case, the original and rotated imges are assumed to be part of the same containing image.

The problem considered here is that of rotating a binary image by 180 degrees quickly. The rotation algorithm proposed uses a novel combination of techniques, including a clever exploitation of the fact that a binary image typically includes large areas containing only zero (white) picture elements, and reversal of the bits in a word by table lookup. It also determines whether the rotation is being performed in situ or not; if so, the algorithm takes advantage of that fact by using an unusual processing order for the words in the image which permits most of the clearing of storage for the output image to be eliminated. By reducing the amount of work required to process the white areas of the image and by eliminating the clearing of the output image in some cases, the amount of processing required for an image is drastically reduced, resulting in code which is significantly faster than current methods.

The bits making up the image are assumed to be stored packed eight to a byte, with each line beginning and ending on a byte boundary. The lines are assumed to be arranged sequentially in storage. Rotation may take place in situ, or the output image may be constructed in an area of storage which does not overlap the input image (so that no data from the original image can be overwritten before it is used). Since bit operations are computationally expensive, IBM System/370 word (32-bit) operations are used to process many bits at a time.

It is possible to extract a subimage from a larger image and rotate it either in situ or into separate storage. It is also possible to store the rotated image as a subimage of a larger image if the rotation does not occur in situ. This is done by skipping bytes between the rows of the input and/or output images, as appropriate.

A different procedure is used depending upon whether the image is to be rotated in situ or not. The in situ case is described first. FIG. 4 shows the basic idea behind the algorithm for in situ rotation. The image may be divided into units of arbitrary length. A unit of four bytes is natural for the IBM S/370, since that is the word length for that processor. If we position two pointers at the middle of the image and step one toward the beginning and the other toward the end of the image, at any given time they will point to two units whose contents must be exchanged. The bits within each unit must also be reversed. As used herein, the term "reversed" refers to the order of the bits in a byte, not to a change from black to white or white to black. For example, the reverse of the bit string 10010111 is 11101001, not 01101000.)

FIG. 5 shows three different possible image classes, and the starting positions of the pointers P1 and P2 used for each class. If the image has an even number of rows, e.g. 2M, then P1 is positioned at the end of row M and P2 is positioned at the beginning of row M+1. (Since it is possible to rotate only a portion of an image by skipping bytes between the rows, it is possible that P1 may not equal P2.) If the number of rows in the image is odd, e.g. 2M+1, then P1 and P2 are both positioned in row M+1. If the number of bytes in a row is even, e.g. 2N, then P1 and P2 are both positioned at column N+1 (i.e. between bytes N and N+1); if the number of bytes in a row is odd, e.g. 2N+1, then P1 is positioned at byte N+1 and P2 is positioned at byte N+2, and byte N+1 (the center byte in the image) is reversed before the main loop begins.

FIG. 6 illustrates the variables used in the in situ rotation method. The flowcharts in FIGS. 7 and 8 describe the method with reference to those variables.

FIG. 7 illustrates the initialization process. Pointers P1 and P2 are set up as described above; pointer P2 is then backed up by the length of a processing unit (in this example, four bytes) since the pointers are both stepped at the beginning of the loop. P1 is not changed because the initial decrement in the loop will cause it to point to the beginning of the first unit to be processed. Three additional variables and a flag are also set up. The pointer LIM is set up to point to the beginning of the row into which P1 points. REM is set to the number of "leftover" bytes in the row. IDEC is set up so that when it is subtracted from P1 after processing one line, P1 will point to the end of the next line to be processed. This same value can be added to P2 after the processing of a row to cause P2 to point to the beginning of the next line to be processed. If the image to be rotated contains an odd number of rows, the values of REM and IDEC may be different for the middle row and for all other rows. The flag CFLAG is set to one if REM and IDEC should be recalculated after the middle row is processed; otherwise it is set to zero.

Note that if the image being rotated lies in contiguous storage (i.e. a subimage of the original image which is narrower than the original image is not being rotated), it is not necessary to handle the ends of rows as a special case; we can step P1 and P2 all the way to the ends of the image and then handle leftover bytes only once. The case where the distance between the end of one row and the beginning of the next is zero is detected as a special case, the LIM pointer is set to indicate the beginning of the image instead of the beginning of the row into which P1 points, and REM is set to the number of leftover bytes in one half of the image. In this case CFLAG is set to zero, since the first "end of row" detected will occur when all of the image rows have been processed.

Figure 8:
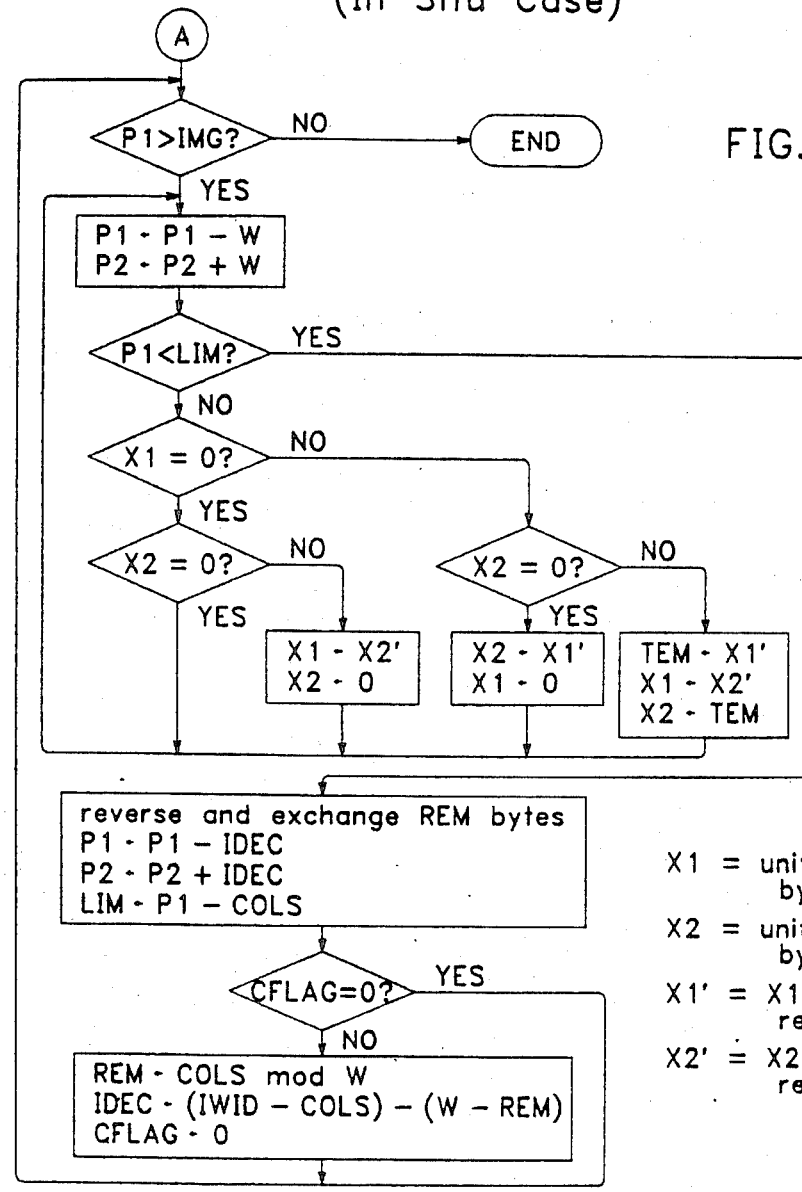
FIG. 8 is a flow chart of the rotation algorithm according to the present invention for in situ rotation.

The rotation is performed using two loops, one nested inside the other, as shown in FIG. 8. The outer loop processes a line of image data. It first tests pointer P1 to determine whether the beginning of the image has been reached. If so, an exit from the loop occurs and the rotation is complete. Otherwise, the inner loop is executed to reverse and exchange all of the complete processing units in the next two rows (the row ending at P1 and the row beginning at P2). This process is described below. After all complete units have been processed, it will be necessary to reverse and exchange some leftover bytes if the length of a row of image data is not a multiple of the processing unit size. Finally, P1 is decremented and P2 is incremented so that they point to the end and the beginning, respectively, of two new lines to be processed. LIM is reset to point to the beginning of the row into which P1 points. If CFLAG is not zero, REM and IDEC are recalculated, and CFLAG is set to zero (since it is not necessary to recalculate REM and IDEC more than once). Control then passes back to the top of the loop.

The inner loop in the rotation procedure reverses and exchanges one pair of processing units on each iteration. First, pointer P1 is decremented by the length of a processing unit (in this example, four bytes), and P2 is incremented by the same amount, so that the two pointers point to the units to be processed. P1 is then compared with LIM. If P1 is less than LIM, the beginning of the row has been passed, and an exit from the loop occurs. (Any leftover bytes are processed by code in the outer loop.) Otherwise, the units pointed to by P1 and P2 are reversed and exchanged. If both units consist entirely of zero bits, no action is necessary, and control returns to the top of the loop. Since this case requires very little work and typically occurs over half of the time, treating it as a special case reduces the processing time for the rotation drastically. If only one of the words is zero, the other word is reversed and stored in its place, and a zero is stored in the place of the other word. Thus, the processing necessary to reverse a word is avoided when a word is zero. If both words are nonzero, both are reversed and the results are exchanged. This most complicated case rarely occurs more than 10% of the time.

Although the above description refers to words having all bits zero, the present invention will operate effectively with images which have a large number of black bits. In such case, a test is made for all ones in a word instead of all zeros and the exchange and reversal proceeds as described.

Figure 9:
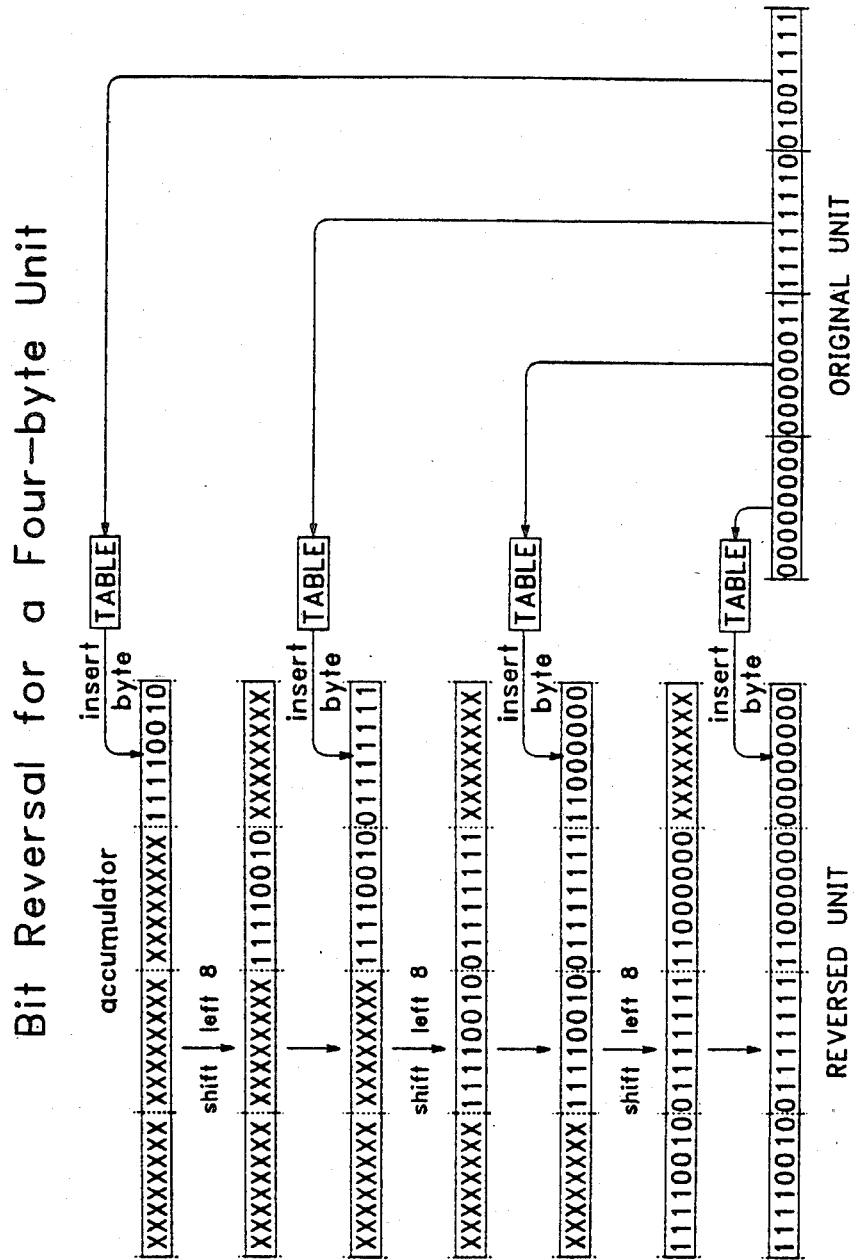
FIG. 9 is a chart showing the bit reversal process according to the present invention.

Bit reversal is accomplished using a lookup table. The process used to reverse a four-byte unit is illustrated in FIG. 9. The lookup table consists of 256 bytes (entries) giving the reverse of the byte used as an index (e.g. the entry in position 131 (hex 83) is hex C1). The binary representation of 83h is 10000011 while the binary representation of C1h is 11000001. The bits of these two binary numbers are the reverse of one another. The lookup table is implemented in a manner well known in the art, that is, an index number, in this example 83h, is input into the lookup table and the value in C1h is returned. Since the System/370 uses a four-byte register to index, a register is first cleared to contain the indices. Byte 4 (the low-order byte) is loaded into the index register, and the result of the table lookup is loaded into an accumulator. The contents of the accumulator are shifted left eight bits, byte 3 is loaded into the index register, and the result of the table lookup is loaded into the accumulator. This loading operation does not destroy the data in the high-order 24 bits of the accumulator, so the reverse of byte 4 is preserved. The accumulator is shifted another 8 bits and loaded with the lookup table value indexed by byte 2, and the process is repeated for byte 1. The result is that the order of the bytes has been reversed, as has the order of the bits in each byte, so the accumulator contains the bit reversal of the original word. The same procedure may be used for processing units of arbitrary lengths, as long as there is a sufficiently large accumulator: bytes are read beginning with the low-order byte of the unit and continuing in order to the high-order byte; the reversed bytes are placed in the low-order end of the accumulator and shifted toward the high-order end to make room for additional bytes.

The method may be modified by having the inner loop process more than one pair of units of data. This will result in the outer loop having a larger range of possible numbers of leftover bytes, but it will also reduce the overhead in the inner loop significantly.

Another possible variation of the inventive method would start the pointers at the beginning and end of the image and step them toward the middle. However, the processing order described above allows the middle row(s) to be handled within the same framework used for the other rows, by simply performing a slightly different initialization.

An alternate embodiment for the case where the input and output images occupy separate storage is now described. This embodiment is illustrated by the flowcharts in FIGS. 10 and 11.

Figure 10:
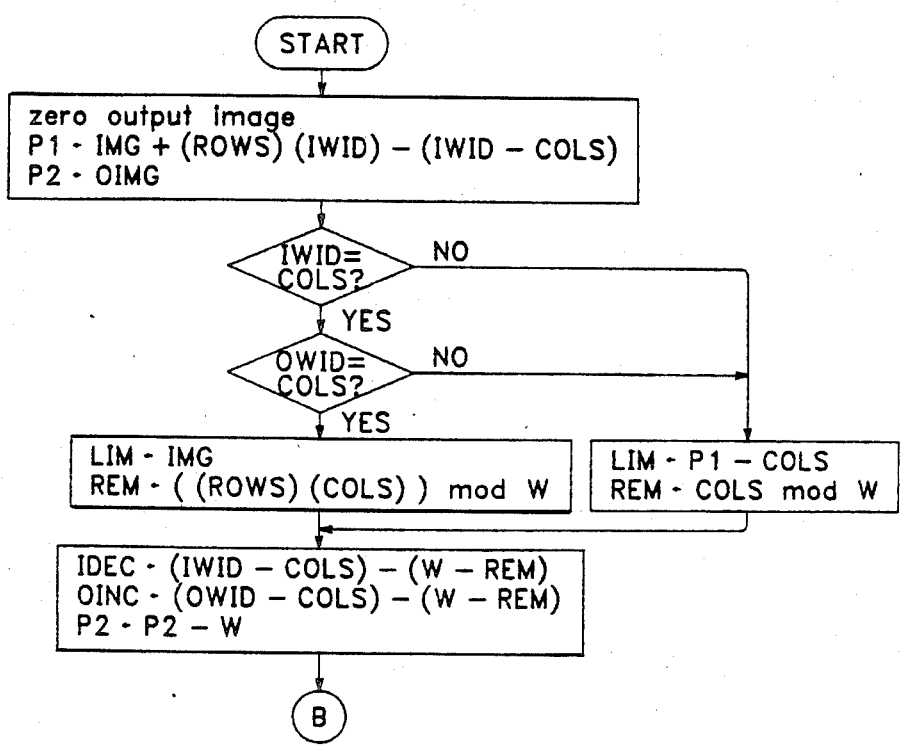
FIG. 10 is a flow chart of the initialization algorithm for not in situ rotation according to the present invention.

FIG. 10 shows the initialization procedure. First, the storage which the output image will occupy is zeroed. Pointer P1 is set to point to the end of the input image, and pointer P2 is set to point to the beginning of the output image. (We could also set P1 to point to the beginning of the input image and P2 to point to the end of the output image and step in the opposite direction.) Before the rotation begins, pointer P2 is backed up by the length of a processing unit since the pointers are both stepped at the beginning of the loop. P1 is not decremented because the initial decrement in the loop will cause it to point to the beginning of the first unit to be processed. The pointer LIM is set to point to the beginning of the row into which P1 points. Three additional variables are also set up. REM is set to the number of "leftover" bytes in a row. IDEC is set up so that when it is subtracted from P1 after processing one line, P1 will point to the end of the next input line to be processed. OINC is calculated so that when it is added to P2 after processing one line, P2 will point to the beginning of the next output line; it is analogous to IDEC.

It is not necessary to handle the ends of the rows as a special case if both the input and output images exist in contiguous storage (i.e. neither is narrower than its containing image). This special case is recognized, and the values of LIM and REM are set accordingly. LIM points to the beginning of the input image, and REM indicates the number of leftover bytes in the image.

Figure 11:
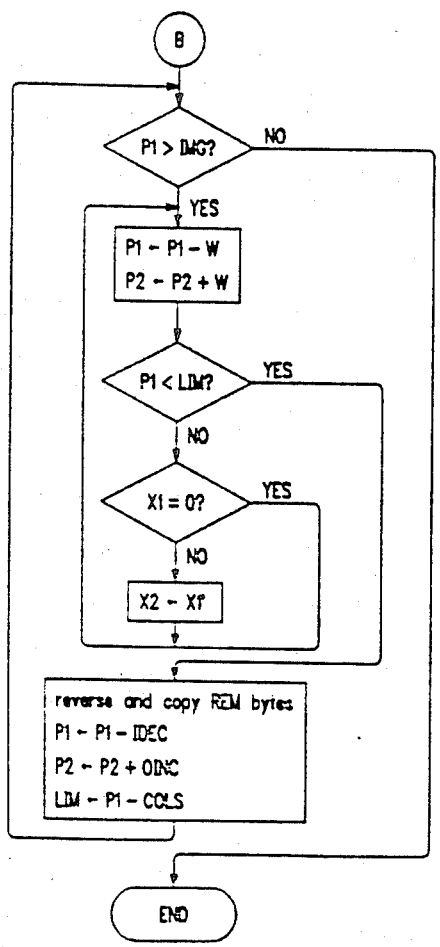
FIG. 11 is a flow chart of the rotation algorithm according to the present invention for not in situ rotation.

FIG. 11 illustrates the rotation process. As for the in situ case, two loops are used. The outer loop processes a line of image data. It first tests pointer P1 to determine whether the beginning of the image has been reached. If so, an exit from the loop occurs and the rotation is complete. Otherwise, the inner loop is executed to reverse and copy all of the complete processing units in the row ending at P1 to the row beginning at P2. After all complete units have been processed, it will be necessary to reverse and copy some leftover bytes if the length of a row of image data is not a multiple of the processing unit size. Finally, P1 is decremented by IDEC and P2 is incremented by OINC so that they point to the end and the beginning, respectively, of the next input and output lines. LIM is reset to point to the beginning of the row into which P1 points. Control then passes to the top of the loop.

The inner loop decrements P1 and increments P2 so that they point to the next unit to be processed, then compares P1 to LIM and leaves the loop if P1 is smaller. For a first case image, to process the unit addressed by P1, we first determine whether it contains only zero data. If so, no action is necessary, since the output image has already been zeroed.

For a second case image. If the image has a predominantly black background rather than white as above, the output image is first set to all ones data and each unit is tested for all ones data. This test eliminates the need to perform the bit reversal and storage in the vast majority of cases, and so reduces the execution time dramatically. If the unit contains nonzero data, for a first case image, or not all ones data for a second case image, it is reversed using the same procedure used to reverse a unit for the in situ case and stored in the output image at the position addressed by P2.

This embodiment like the in situ embodiment, may be modified by having the inner loop process more than one pair of units of data to reduce the loop overhead at the cost of some additional complexity in the outer loop.

The program embodying the present invention requires a single parameter PARM which gives the address of a list of six parameters controlling the rotation. These parameters are stored in a 24-byte buffer; all parameters are full 4 byte words. FIXED(31) specifies a 4 byte value; PTR(31) indicates variables which will be addresses. The six parameters are:

| DCL PARM | PTR(31); DCL |
|---|---|
| 1 LIST | BASED(PARM), |
| 2 INIMAGE | PTR(31), |
| 2 OUTIMAGE | PTR(31), |
| 2 ROWS | FIXED(31), |
| 2 COLS | FIXED(31), |
| 2 IWID | FIXED(31), |
| 2 OWID | FIXED(31); |

INIMAGE-Pointer to the first byte (i.e. the upper left-hand corner byte) of the original image.

OUTIMAGE-Pointer to the location where the first byte of the output image is to be stored.

ROWS-Number of lines in the original image. (Corresponds to "r" in FIGS. 1, 2, and 3.)

COLS-Number of (byte) columns in the original image. (Corresponds to "c" in FIGS. 1, 2, and 3.)

IWID-Number of (byte) columns in the image of which the original image is a part. If IWID=0, the width of the original image (COLS) is substituted for IWID. (IWID corresponds to "w" in FIGS. 1, 2, and 3.)

OWID-Number of (byte) columns in the image of which the output image is a part. If OWID=0, the width of the output image (COLS) is substituted for OWID. (OWID corresponds to "ow" in FIGS. 1, 2, and 3.)

The program rotates an image of ROWS rows and COLS columns beginning at the address pointed to by INIMAGE. The rotation is by 180 degrees. The rotated image is placed at the address pointed to by OUTIMAGE. The input and/or output images may be part of a larger image. The input and output widths (IWID and OWID) give the number of columns in the containing input and output images. A value of zero for either IWID or OWID indicates that the corresponding image is not contained in a larger image.

INIMAGE and OUTIMAGE may point to the same address. In this case the image is rotated in situ, and IWID and OWID must be equal. If INIMAGE and OUTIMAGE do not point to the same address, the input and output areas may not overlap. If the area of storage between the beginning and the end of the input image overlaps the area of storage between the beginning and end of the output image (conceptually, if any line of the containing image contains lines from both the input and output images), then the widths of the input and output containing images must be equal (i.e. IWID must equal OWID).

Separate processing occurs for in situ and not in situ rotation. A test is made to see which process is to be used and a branch to the appropriate code occurs.

For in situ rotation, the pointers "p1" and "p2" are set to point to the middle of the image. "p1" steps back toward the beginning of the image, and "p2" steps forward toward the end of the image. After each step, two pairs of words are examined. If both words in a pair are zero, no action is necessary. Otherwise, the words are reversed and swapped (with the special cases where one of the words is zero being handled separately). A word is reversed by doing a table lookup to reverse each byte and reversing the order of the bytes in the word.

If the image being reversed is in contiguous storage (i.e. IWID=OWID=COLS), the entire image can be done within the inner loop (the loop which processed two words). If the image is imbedded in a larger image, the pointers must be reset at the end of each line to avoid altering data outside of the image which is being reversed. Each iteration of the outer loop processes two rows, one before the middle of the image and one after.

For rotation not in situ, the entire output image is first zeroed. Pointer "p1" is set to point to the end of the input image and pointer "p2" is set to point to the beginning of the output image. A loop then steps both pointers through their respective images in opposite directions, skipping zero words in the input image and transferring the reverse of any nonzero input words to the output image.

As in the in situ rotation, the case where the input and output images are both contiguous can be handled with one execution of the inner loop. The outer loop processes one row of image data at a time to handle the case were one or both of the images is imbedded in a larger image.

The inner loops for both types of rotation step through the images eight bytes at a time. This algorithm will also work with four-byte steps with appropriate alterations. The eight-byte steps simply decrease the loop overhead somewhat.

The program embodying the present invention requires an area of storage to contain its variables. These variables are as follows:

Variables in procedure storage

| name | type | offset from beginning of storage |
|---|---|---|
| inimage | PTR(31) | 0 |
| inimageb | FIXED(8) | 0 |
| outimage | PTR(31) | 4 |
| outimageb | FIXED(8) | 4 |
| rows | FIXED(32) | 8 |
| cols | FIXED(32) | 12 |
| iwid | FIXED(32) | 16 |
| owid | FIXED(32) | 20 |
| p1 | PTR(31) | 24 |
| p2 | PTR(31) | 28 |
| lim | PTR(31) | 32 |
| idec | FIXED(32) | 36 |
| oinc | FIXED(32) | 40 |
| temp1 | FIXED(32) | 44 |
| t10 | FIXED(8) | 44 |
| t11 | FIXED(8) | 45 |
| t12 | FIXED(8) | 46 |
| t13 | FIXED(8) | 47 |
| temp2 | FIXED(32) | 48 |
| t20 | FIXED(8) | 48 |
| t21 | FIXED(8) | 49 |
| t22 | FIXED(8) | 50 |
| t23 | FIXED(8) | 51 |
| cflag | FIXED(8) | 52 |
| rem | FIXED(8) | 53 |
| temb | FIXED(8) | 54 |
| tbl(256) | FIXED(8) | 55 |

Variables based on the pointer "p1"

| name | type | offset from p1 |
|---|---|---|
| midbyte | FIXED(8) | 0 |
| w11 | FIXED(32) | 0 |
| b11 | FIXED(8) | 0 |
| b12 | FIXED(8) | 1 |
| b13 | FIXED(8) | 2 |
| b14 | FIXED(8) | 3 |
| w12 | FIXED(32) | 4 |
| b15 | FIXED(8) | 4 |
| b16 | FIXED(8) | 5 |
| b17 | FIXED(8) | 6 |
| b18 | FIXED(8) | 7 |

Variables based on the pointer "p2"

| name | type | offset from p2 |
|---|---|---|
| w21 | FIXED(32) | 0 |
| b21 | FIXED(8) | 0 |
| b22 | FIXED(8) | 1 |
| b23 | FIXED(8) | 2 |
| b24 | FIXED(8) | 3 |
| w22 | FIXED(32) | 4 |
| b25 | FIXED(8) | 4 |
| b26 | FIXED(8) | 5 |
| b27 | FIXED(8) | 6 |
| b28 | FIXED(8) | 7 |

The lookup table "tbl" is initialized with the following hexadecimal values:

| 00 | 80 | 40 | C0 | 20 | A0 | 60 | E0 |
|---|---|---|---|---|---|---|---|
| 10 | 90 | 50 | D0 | 30 | B0 | 70 | F0 |
| 08 | 88 | 48 | C8 | 28 | A8 | 68 | E8 |
| 18 | 98 | 58 | D8 | 38 | B8 | 78 | F8 |
| 04 | 84 | 44 | C4 | 24 | A4 | 64 | E4 |
| 14 | 94 | 54 | D4 | 34 | B4 | 74 | F4 |
| 0C | 8C | 4C | CC | 2C | AC | 6C | EC |
| 1C | 9C | 5C | DC | 3C | BC | 7C | FC |
| 02 | 82 | 42 | C2 | 22 | A2 | 62 | E2 |
| 12 | 92 | 52 | D2 | 32 | B2 | 72 | F2 |
| 0A | 8A | 4A | CA | 2A | AA | 6A | EA |
| 1A | 9A | 5A | DA | 3A | BA | 7A | FA |
| 06 | 86 | 46 | C6 | 26 | A6 | 66 | E6 |
| 16 | 96 | 56 | D6 | 36 | B6 | 76 | F6 |
| 0E | 8E | 4E | CE | 2E | AE | 6E | EE |
| 1E | 9E | 5E | DE | 3E | BE | 7E | FE |
| 01 | 81 | 41 | C1 | 21 | A1 | 61 | E1 |
| 11 | 91 | 51 | D1 | 31 | B1 | 71 | F1 |
| 09 | 89 | 49 | C9 | 29 | A9 | 69 | E9 |
| 19 | 99 | 59 | D9 | 39 | B9 | 79 | F9 |
| 05 | 85 | 45 | C5 | 25 | A5 | 65 | E5 |
| 15 | 95 | 55 | D5 | 35 | B5 | 75 | F5 |
| 0D | 8D | 4D | CD | 2D | AD | 6D | ED |
| 1D | 9D | 5D | DD | 3D | BD | 7D | FD |
| 03 | 83 | 43 | C3 | 23 | A3 | 63 | E3 |
| 13 | 93 | 53 | D3 | 33 | B3 | 73 | F3 |
| 0B | 8B | 4B | CB | 2B | AB | 6B | EB |
| 1B | 9B | 5B | DB | 3B | BB | 7B | FB |
| 07 | 87 | 47 | C7 | 27 | A7 | 67 | E7 |
| 17 | 97 | 57 | D7 | 37 | B7 | 77 | F7 |
| 0F | 8F | 4F | CF | 2F | AF | 6F | EF |
| 1F | 9F | 5F | DF | 3F | BF | 7F | FF |

Since the language in which this program is written employs forward Polish notation, an end-of-statement symbol (such as the ";" in PL/I) is unnecessary in most cases.

All array indices are expressed as offsets in bytes from the beginning of the array.

The following subroutines are assumed to be available:

copies N bytes from

```
copy(DEST,SOURCE,N)        zeroes N bytes
                           # SOURCE to DEST
zero (DEST,N)              #beginning at DEST procedure revw11;

t20=tbl(expl b14)

t21=tbl(expl b13)

t22=tbl(expl b12)

t23=tbl(expl b11)

end procedure revw21;

t10=tbl(expl b24)

t11=tbl(expl b23)

t12=tbl(expl b22)

t13=tbl(expl b21)

end procedure revw12;

t20=tbl(expl b18)

t21=tbl(expl b17)

t22=tbl(expl b16)

t23=tbl(expl b15)

end procedure revw 22;

t10=tbl(expl b28)

t11=tbl(expl b27)

t12=tbl(expl b26)

t13=tbl(expl b25)

end procedure turn 180(argpt);

call copy(addr inimage;argpt,24)

inimageb=0 outimageb=0 if iwid=0 iwid=cols end if owid=0 owid=cols end if inimage=outimage goto nis end if and rows 1=0 p2=+inimage *iwid srl rows 1 p1=+−p2 iwid cols lim=−p1 cols cflag=0 else p2=++inimage *iwid srl rows 1 srl cols 1 if and cols 1=0 p1=p2 else p1=p2 p2=+p2 1 midbyte=tbl(expl midbyte)

end lim=−p1 srl cols 1 cflag=1 end
```

```
-continued
if iwid=cols lim=inimage cflag=0 end rem=expl and −p1 lim 7 idec=− −iwid cols −8 expl rem p2=−p2 8 begin if p1 >inimage leave end begin p1=−p1 8 p2=+p2 8 if p1<lim leave end if w11=0 if w22 =0 call revw22 w11=temp1 w22=0 end else if w22=0 call revw11 w22=temp2 w11=0 else call revw11 call revw22
```

```
-continued
      w11=temp1 w22=temp2 end end if w12=0 if w21 =0 call revw21 w12=temp1 w21=0 end else if w21=0 call revw12 w21=temp2 w12=0 else call revw12 call revw21 w12=temp1 w21=temp2 end end repeat end if rem =0 if rem 1gt 3 if w12=0 if w21 =0
```

```
          call revw21 w12=temp1 w21=0 end else if w21=0 call revw12 w21=temp2 w12=0 else call revw12 call revw21 w12=temp1 w21=temp2 end end if rem  =4 temb=tbl(expl b14)

b14=tbl(expl b25)

b25=temb if rem  =5 temb=tbl(expl b13)

b13=tbl(expl b26)

b26=temb if rem  =6 temb=tbl(expl b12)

b12=tbl(expl b27)
```

```
         b27=temb end end end else temb=tbl(expl b18)

b18=tbl(expl b21)

b21=temb if rem  =1 temb=tbl(expl b17)

b17=tbl(expl b22)

b22=temb if rem  =2 temb=tbl(expl b16)

b16=tbl(expl b23)

b23=temb end end end end p1=−p1 idec p2=+p2 idec lim=−p1 cols if cflag  =0 rem=expl and −p1 lim 7 idec=−−iwid cols −8 expl rem cflag=0
```

```
        end repeat end return;

label nis p1 = - +inimage *rows iwid -iwid cols p2 = outimage if & (iwid=cols) (owid=cols)

lim = inimage rem = expl and *rows cols 7 else lim = -p1 cols rem = expl and cols 7 end idec = - -iwid cols -8 expl rem oinc = - -owid cols -8 expl rem if owid = cols zero outimage *rows cols else b0 = +outimage *rows owid begin b0 = -b0 owid if b0 < outimage leave end zero b0 cols repeat end end p2 = -p2 8 begin if p1 > inimage leave end begin p1 = -p1 8 p2 = +p2 8 if p1 < lim leave end if w11 = 0 call revw11 w22 = temp2 end if w12 = 0 call revw12 w21 = temp2 end repeat end if rem = 0 if rem lgt 3 if w12 = 0 call revw12 w21 = temp2 end if rem = 4 b25 = tbl(expl b14)

if rem = 5 b26 = tbl(expl b13)

if rem = 6
```

```
            b27=tbl(expl b12)

end end end else b21=tbl(expl b18)

if rem  =1 b22=tbl(expl b17)

if rem  =2 b23=tbl(expl b16)

end end end end p1= —p1 idec p2= +p2 oinc lim=p1 lim= —lim cols repeat end return;

end return;
```

Thus, while the invention has been described with reference to preferred embodiments thereof, it will be understood by those skilled in the art that various changes in form and details may be made without departing from the scope of the invention.

What is claimed is:

1. A method for rotating a binary image in situ by 180 degrees, comprising the steps of:
segmenting an image to be rotated into units of bits of a size exchangeable with each other;
determining first and second halves of said image to be rotated;
positioning first and second index pointers at first and second locations on the first and second halves of said image to be rotated;
indexing said first pointer in a first direction through said first half of said image;
indexing said second pointer in a second direction through said second half of said image;
exchanging, for each index step, a first image unit addressed by said first pointer with a second image unit addressed by said second pointer;
reversing the order of the bits in each said exchanged unit;
storing said reversed, exchanged units at said pointer locations; and
repeating said above steps of indexing, exchanging, reversing, and storing until said first pointer and said second pointer have been indexed through all units in said first and second values, respectively, of said image, whereby said image is rotated by 180 degrees.

2. A method according to claim 1 wherein said step of exchanging further comprises testing each pair of units for all zero bits.

3. A method according to claim 1 wherein said step of exchanging further comprises testing each pair of units for all one bits.

4. A method according to claim 1 wherein said step of reversing further comprises testing each unit for all zero bits and omitting the reversal process for any unit consisting of all zero bits.

5. A method according to claim 1 wherein said step of reversing further comprises testing each unit for all one bits and omitting the reversal process for any unit consisting of all one bits.

6. A method according to claim 1 wherein said first and second pointers are initially set to a location in a center of said image and said first pointer is indexed toward a beginning of said image and said second pointer is indexed toward an end of said image.

7. A method according to claim 1 wherein said first pointer is initially set to a location at a beginning of said image and said second pointer is set to a location at an end of said image and said first pointer and said second pointer are indexed toward a center of said image.

8. A method according to claim 1, further comprising the step of defining a subimage from said image and rotating said subimage by the steps set forth.

9. A method according to claim 1, further comprising the step of imbedding an image rotated by the above steps in a larger image at a predetermined location.

10. A method according to claim 1, further comprising the step of omitting the exchanging step whenever all of the bits in said first and second image units to be exchanged have the same value.

11. A method according to claim 1 wherein said first and second pointers are initially set to a location within said image and said first pointer is indexed toward one edge of said image and said second pointer is indexed toward the opposite edge of said image.

12. A method according to claim 1 wherein said first pointer is initially set to a location at one edge of said image and said second pointer is set to a location at the opposite edge of said image and said first and second pointers are indexed toward the center of said image.

13. A method according to claim 1, further comprising the step of defining a subimage from said image and rotating said subimage in situ by the steps set forth.

14. Apparatus for rotating a binary image in situ by 180 degrees, comprising:
    means for segmenting said image to be rotated into units of bits of a size exchangeable with each other;
    means for determining first and second halves of said image to be rotated;
    means for positioning first and second index pointers at first and second locations on the first and second halves of said image;
    means for indexing said first pointer in a first direction through said first half of said image;
    means for indexing said second pointer in a second direction through said second half of said image;
    means for exchanging, for each index step, a first image unit addressed by said first pointer with a second image unit addressed by said second pointer;
    means for reversing the order of the bits in each said exchanged unit;
    means for storing said reversed, exchanged units at said pointer locations;
    means for repeatedly actuating said indexing, exchanging, reversing, and storing means until said first and second pointers have been indexed through all units in said first and second image halves, respectively, whereby said image is rotated by 180 degrees.

15. Apparatus according to claim 14 wherein said exchanging means further comprises means for testing each pair of units to be exchanged for all bits of the same value.

16. Apparatus according to claim 14 wherein said reversing means further comprises means for testing each unit for all bits of the same value and means for deactivating said reversing means for any unit consisting of all bits of the same value.

17. Apparatus according to claim 14 wherein said positioning means further comprises means for initially setting said first and second pointers to a location in the center of said image with said first pointer indexed toward the beginning of said image and said second pointer indexed toward the end of said image.

18. Apparatus according to claim 14 wherein said positioning means further comprises means for initially setting said first pointer to a location at one edge of said image and means for setting said second pointer to a location at the opposite edge of said image with said first and second pointers indexed toward the center of said image.

19. Apparatus according to claim 14 further comprising means for defining a subimage within said image and rotating said subimage by the said means set forth.

20. Apparatus according to claim 14, further comprising means for imbedding an image rotated by said means and set forth in a larger image at a predetermined location.

* * * * *